US005489029A

United States Patent [19]

Jonckheere et al.

[11] Patent Number: 5,489,029
[45] Date of Patent: Feb. 6, 1996

[54] HARVESTER SIEVE OPENING INDICATOR

[75] Inventors: Marc R. M. Jonckheere, Jabbeke; Dirk G. C. Leupe, Roselare; Willy C. Hollevoet, Torhout; Gilbert J. I. Strubbe, Zedelgem, all of Belgium

[73] Assignee: New Holland North America, Inc., New Holland, Pa.

[21] Appl. No.: 255,211

[22] Filed: Jun. 7, 1994

[30] Foreign Application Priority Data

Jun. 14, 1993 [EP] European Pat. Off. .............. 93201702

[51] Int. Cl.$^6$ ........................................ B07B 13/05

[52] U.S. Cl. ........................... 209/676; 209/394; 209/352

[58] Field of Search ........................... 209/394, 676, 209/404, 352, 413, 421; 222/48, 44; 239/73

[56] References Cited

U.S. PATENT DOCUMENTS 4,712,568 12/1987 Strong et al. ....................... 209/394 X

*Primary Examiner*—David H. Bollinger
*Attorney, Agent, or Firm*—Frank A. Seemar; Larry W. Miller

[57] ABSTRACT

An adjustable sieve mechanism for an agricultural harvesting machine comprising louvres positioned behind one another and being movable through a range of positions between a fully closed and a fully opened position. Consecutive louvres define an opening when in an opened position. An adjustment mechanism is provided for changing the opening. Also provided is an opening indicator including a movable part which is unitarily moved with one of the louvres when the opening is adjusted. The indicator permits verification of the sieve opening even when the louvres are not accessible for measurement with gauges, and a direct link between the louvres and the movable part avoids the inaccuracies which are conceivable when the indicator is sensing the movement of further, intermediate components of the adjustment mechanism.

7 Claims, 7 Drawing Sheets

HARVESTER SIEVE OPENING INDICATOR

FIELD OF THE INVENTION

The present invention relates to agricultural harvesting machines such as combine harvesters, and more particularly to the adjustable grain sieves thereof. The invention is particularly advantageous when on the one hand access to one of this sieves is limited in such way that direct verification of the actual sieve opening is hindered and on the other hand when a precise sieve setting is required for obtaining an efficient grain cleaning.

BACKGROUND OF THE INVENTION

Combine harvesters have been developed for efficient harvesting of a wide range of crops. To this end a variety of machine settings can be changed and adjusted. These include the setting of the louvres of the upper and lower sieves. The opening between these louvres has to be adapted to the grain type in order to obtain an efficient separation of grain on the one hand and chaff and straw on the other hand. Especially the opening of the lower sieve has to be adjusted to a precise sieve setting in order to meet optimum grain cleaning requirements. Sieves enabling such adjustments have already been described in U.S. Pat. No. 2,253,296, issued Aug. 19, 1941 in the name of William A. Holtzman.

Usually the opening of the upper sieve is verified by the insertion of calibrated means such as gauges between the louvres at the rear of the sieve. The surface of the upper sieve mostly is readily accessible for such measurement. The lower sieve however is not as easily accessible because of its hidden position under the upper sieve. Access to the louvres of the lower sieve can further be hindered by extensions connected to the rear of the upper sieve, such as a rake or a sensor plate for a grain loss indicator. The use of calibrated means for the verification of this opening thus is rendered impractical.

Several methods have been thought of to by-pass this problem. On sieves with an adjustment handle which is locked into a toothed segment, it is a common practice to count the number of teeth that lay between a leftmost position, in which the louvres are closed, and the actual position of the handle. But this is not an accurate measurement of the sieve opening, because the leftmost position does not correspond to the same tooth on every sieve and the opening determined by one tooth does not necessarily correspond to a step of, e.g., exactly one millimeter. Further inaccuracies occur because of the tolerances on the dimensions of the intermediate adjustment links and handles, because of the play of these components relative to each other and because of the possible deformation thereof during operation.

The German Utility Model No. 69 05,754, issued in the name of Kodel and Bohm, Gmbh., shows a graduated scale applied to an adjustment member of the sieve opening. Other types of sieve opening indicators on adjustment means can be found in U.S. Pat. No. 3,472,378, issued Oct. 14, 1969 in the name of Amos O. Payne. These indicators may give an opening read-out in millimeters or fractions of an inch, but the zero position which corresponds to fully closed sieve louvres, is not indicated. Neither do these systems cope with the inaccuracies caused by the tolerances, play and deformation of the adjustment means intermediate the adjustment member and the louvres.

SUMMARY OF THE INVENTION

Accordingly, it is an object of the present invention to overcome the aforementioned problems of louvre opening measurement in a simple effective manner.

According to the present invention an adjustable sieve means for an agricultural harvesting machine is provided which comprises louvres positioned behind one another and being movable through a range of positions between a fully closed and a fully opened position, consecutive louvres defining an opening therebetween when in an opened position, adjustment means for changing the opening, and opening indicator means including a movable part.

This sieve means is characterized in that the movable part and at least one of the louvres are unitarily moved, when the opening is adjusted.

Preferably the movable part is moved by the support means to which the louvre is affixed. The actual opening may be displayed in length units on a graduated scale. For better visibility this graduated scale may be provided upon the movable part and a horizontal edge of a stationary part may serve as a reference point for reading out the actual sieve opening.

Alternatively, a potentiometric device, directly linked to the louvre support means, may be used for sensing the louvre position.

For ease of control of the opening, the opening indicator means may be installed adjacent to the sieve adjustment means, such as an adjustment handle.

The foregoing and other objects, features and advantages of the invention will appear more fully hereinafter from a consideration of the detailed description which follows, in conjunction with the accompanying sheets of drawings wherein the principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

The terms "forward", "left", "right", "rear", etc. used in connection with the agricultural harvesting machine and/or components thereof are determined with reference to the direction of forward operative travel, but should not be considered as limiting. Also, the terms "grain", "straw" and "tailings" are used principally throughout this specification for convenience and it should be understood that these terms are not intended to be limiting. Thus "grain" refers to that part of the crop material which is threshed and separated from the discardable part of the crop material which is referred to as "straw". Incompletely threshed ears are referred to as "tailings".

Figure 1:
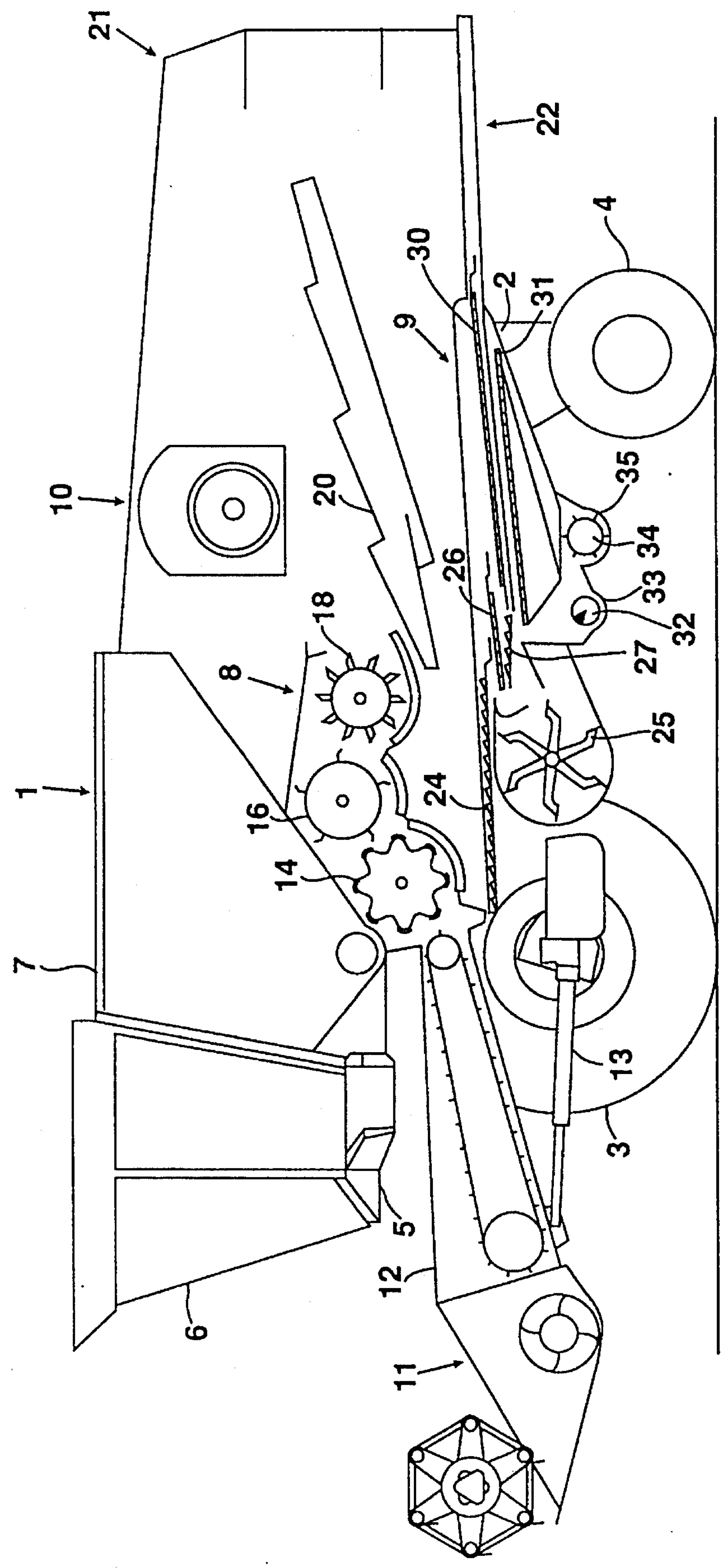
FIG. 1 is a schematic elevational view lengthwise of a combine harvester.

Although the combine harvester illustrated in FIG. 1 is of conventional design, employing straw walkers, it should be appreciated that the invention is equally applicable to rotary combines such as the axial flow type combine.

For ease of reference, a brief general description of the combine harvester shown in FIG. 1 will be given. This combine harvester, generally indicated at 1, comprises a main chassis or frame 2 supported on a front pair of drive wheels 3 and a rear pair of steerable wheels 4. Supported on the main chassis 2 are an operator's platform 5, with operator's cab 6, a grain tank 7, a threshing and separating mechanism 8, a grain cleaning mechanism 9 and a power plant or engine 10. A conventional header 11 and straw elevator 12 extend forwardly of main chassis 2 for generally vertical movement which is controlled by extensible hydraulic cylinders 13.

As combine harvester 1 is propelled forwardly over a field with standing crop, the latter is severed from the stubble by a sickle bar at the front of header 11, whereafter header 11 and straw elevator 12 supply the cut crop to threshing and separating mechanism 8. The crop received therein is threshed and separated, that is to say, the crop is rubbed and beaten, whereby the grain, seed or the like, is loosened and separated from the straw and other discardable parts of the crop.

The combine harvester illustrated in FIG. 1 comprises a conventional threshing mechanism including a threshing cylinder 14, a straw beater 16 and a separator rotor 18. Conventional straw walkers 20 are operable, in use, to discharge a layer of remaining crop material (i.e. mainly straw as the grain is separated therefrom) through straw hood 21. Grain which has been separated by threshing and separating mechanism 8 falls onto a first grain pan 24 of cleaning mechanism 9 which further also comprises a pre-cleaning sieve 26, positioned above a second grain pan 27, a pair of sieves 30, 31, disposed one above the other, and a cleaning fan 25.

The grain pans 24, 27 and sieves 26, 30, 31 are oscillated generally back-and-forth for transporting threshed and separated grain from first grain pan 24 to pre-cleaning sieve 26 and second grain pan 27 and therefrom to sieves 30, 31. The same oscillatory movement spreads said grain across sieves 26, 30, 31, while permitting the passage of cleaned grain by gravity through these sieves 26, 30, 31. The grain on sieves 26, 30, 31 is subjected to a cleaning action by fan 25 which provides an air flow through sieves 26, 30, 31 to remove chaff and other impurities such as dust from the grain by making this material airborne for discharge from the machine through outlet 22 of straw hood 21.

Clean grain eventually falls to a clean grain auger 32 in a clean grain auger trough 33 and is subsequently transferred therefrom to grain tank 7. Tailings eventually fall to a tailings auger (not shown) in a tailings auger trough 35. The tailings are transported by tailings auger to a separate rethresher 34 and returned to cleaning mechanism 9 for repeated cleaning action.

All components described so far are conventional in the art, and therefore no further detailed description thereof is deemed necessary.

Figure 2:
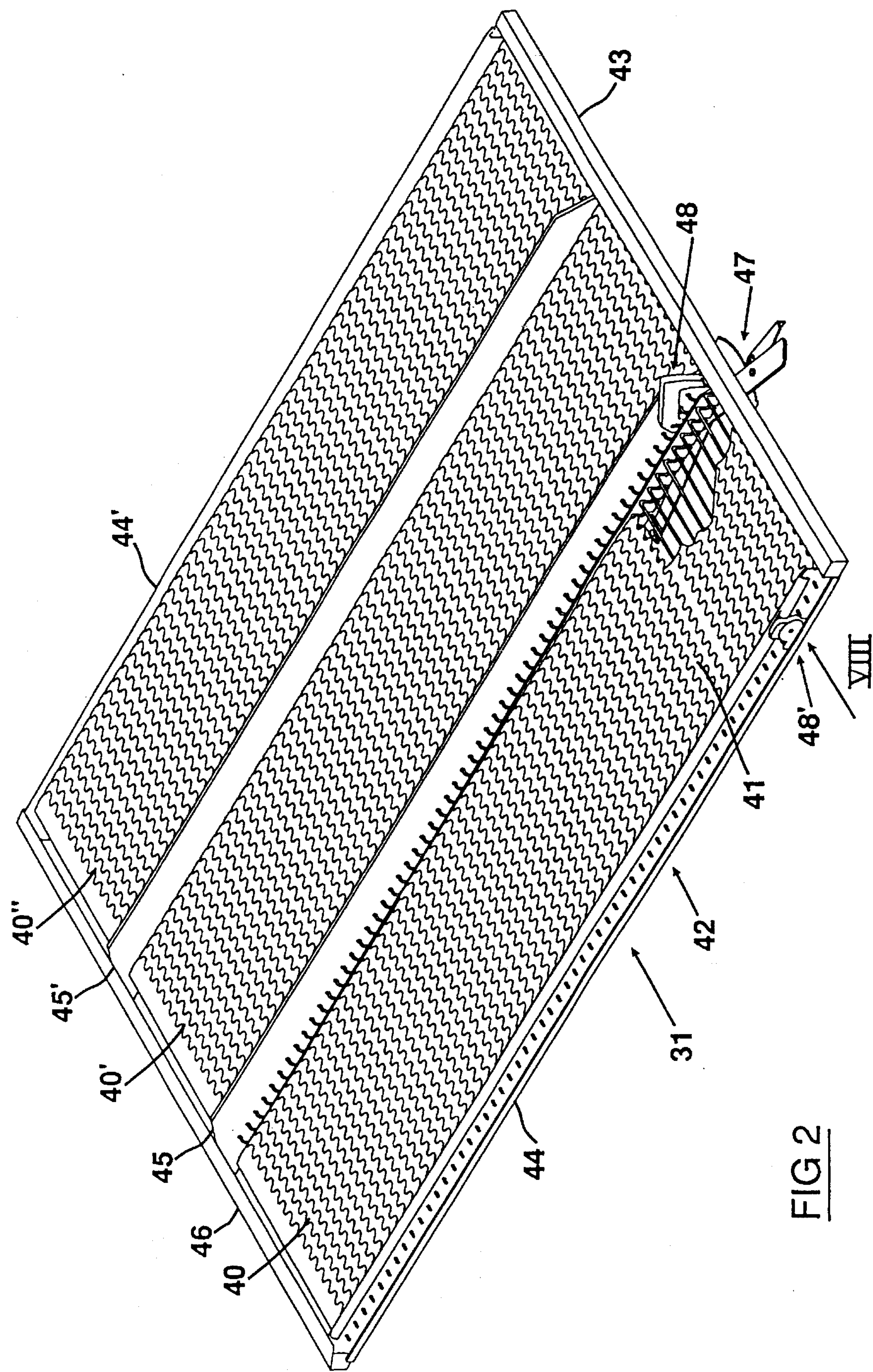
FIG. 2 shows a lower sieve of the sieve means shown in FIG. 1.

Referring now to FIG. 2, a lower sieve 31 according to the present invention will be described in further detail. This sieve 31 comprises a plurality of louvre sets 40, 40', 40", mounted in a sieve frame 42. It further comprises sieve adjustment means 47 and indicator means 48 Each louvre set 40, 40', 40" is formed by a series of adjustable louvres 41, which are positioned one behind the other. The sieve frame 42 comprises a rear frame member 43, side frame members 44, 44', a front frame member 46 and intermediate frame members 45, 45', the latter being provided between said side frame members 44, 44' and extending parallel therewith.

Figure 3:
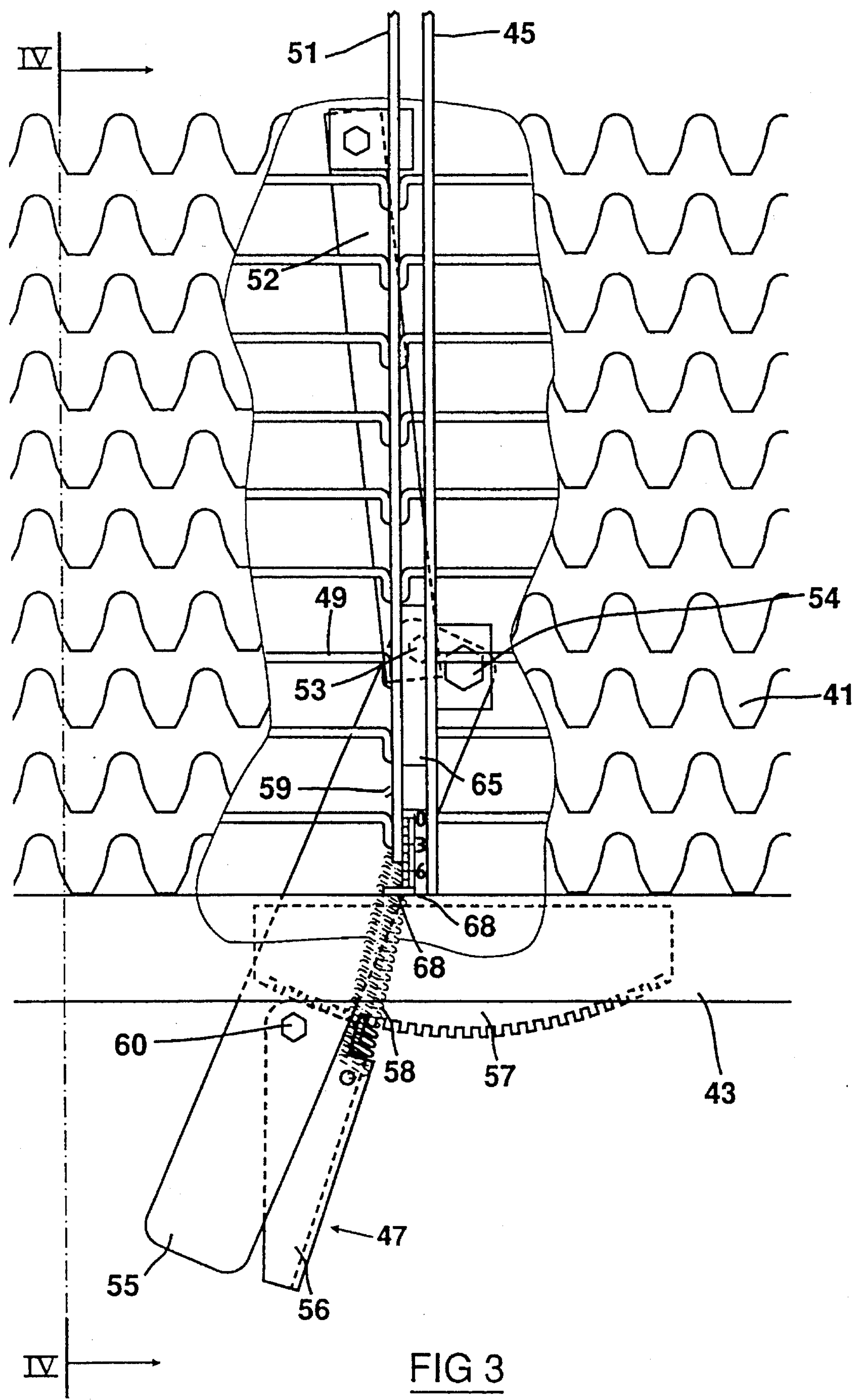
FIG. 3 illustrates to a larger scale a part of the rear portion of the sieve of FIG. 1 in which portions have been removed for better visibility.
Figure 4:
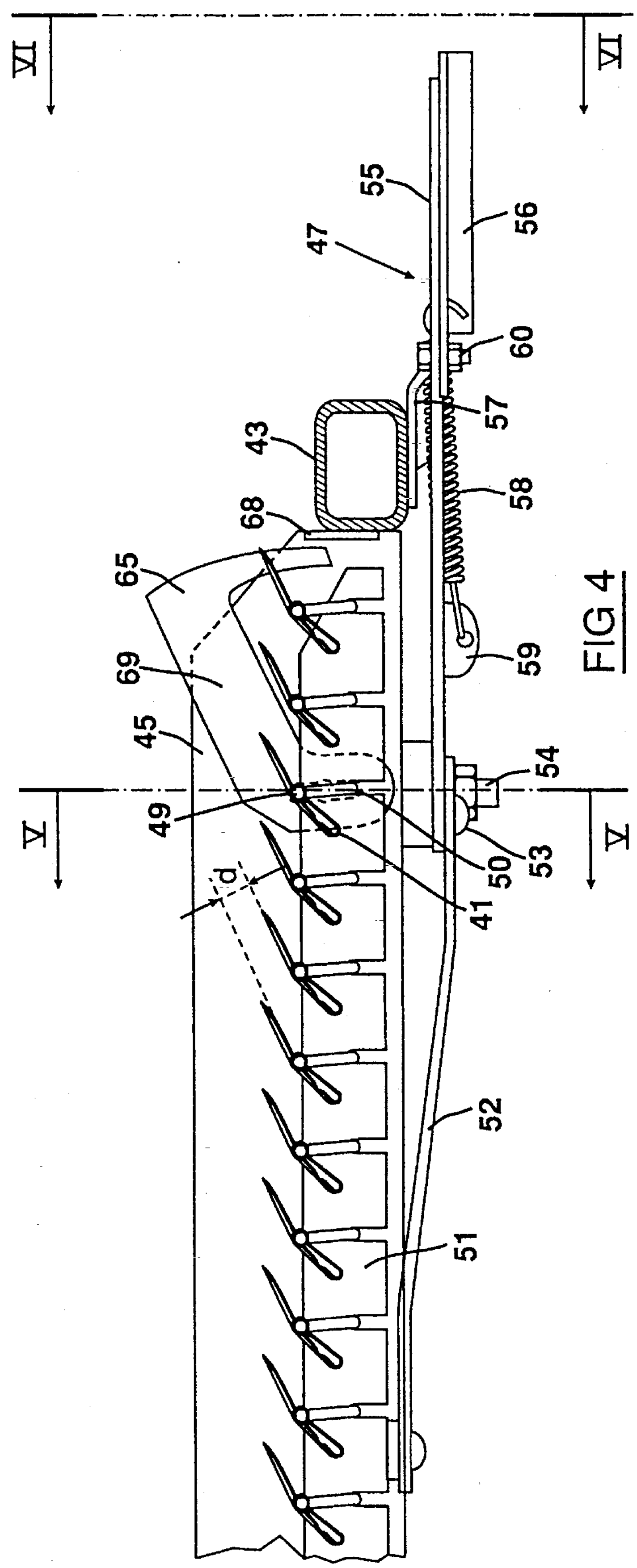
FIG. 4 shows a partial sectional view taken along the lines IV—IV in FIG. 3.

As illustrated in FIGS. 3 and 4 louvres 41 are attached to mounting rods 49, which are pivotably mounted in holes in side frame members 44, 44' and intermediate frame members 45, 45'. Adjacent to intermediate frame member 45 these mounting rods 49 are provided with a cranked extension 50, the position of which can be changed by sieve adjustment means 47, whereby rods 49 are pivoted around their respective axes of rotation defined by the mounting holes in said frame members 44, 44', 45, 45'. The pivotal movement of rods 49 rotates attached louvres 41 concurrently and changes the sieve opening between two adjacent louvres 41 as defined by distance d depicted in FIG. 4.

The position of cranked extensions 50 is controlled by the slots in an adjustment slat 51, which is connected through a link member 52 to an adjustment handle 55. This adjustment handle 55 is pivotably attached at a pivot 54 to the intermediate frame member 45 and is locked in position by means of a locking handle 56 intermeshing with a toothed segment 57, which is welded to the rear frame member 43. This locking handle 56 is pivotably attached to adjustment handle 55 at a second pivot 60 and held in mesh with toothed segment 57 by a spring 58.

For adjusting the sieve opening d the said locking handle 56 is pushed towards adjustment handle 55, thus releasing it from toothed segment 57, and adjustment handle 55 is turned about pivot 54 in one or other direction. Accordingly, the link member 52, which is connected to adjustment handle 55 through an eccentric link 53, is pushed forward or backward, which movement is transferred upon adjustment slat 51. The action of adjustment slat 51 on cranked extensions 50 urges the rear ends of louvres 41 to raise when adjustment slat 51 is moved to the rear of combine harvester 1 and urges the same to lower when said slat 51 is moved to the front, respectively increasing or decreasing sieve opening d.

Figure 5:
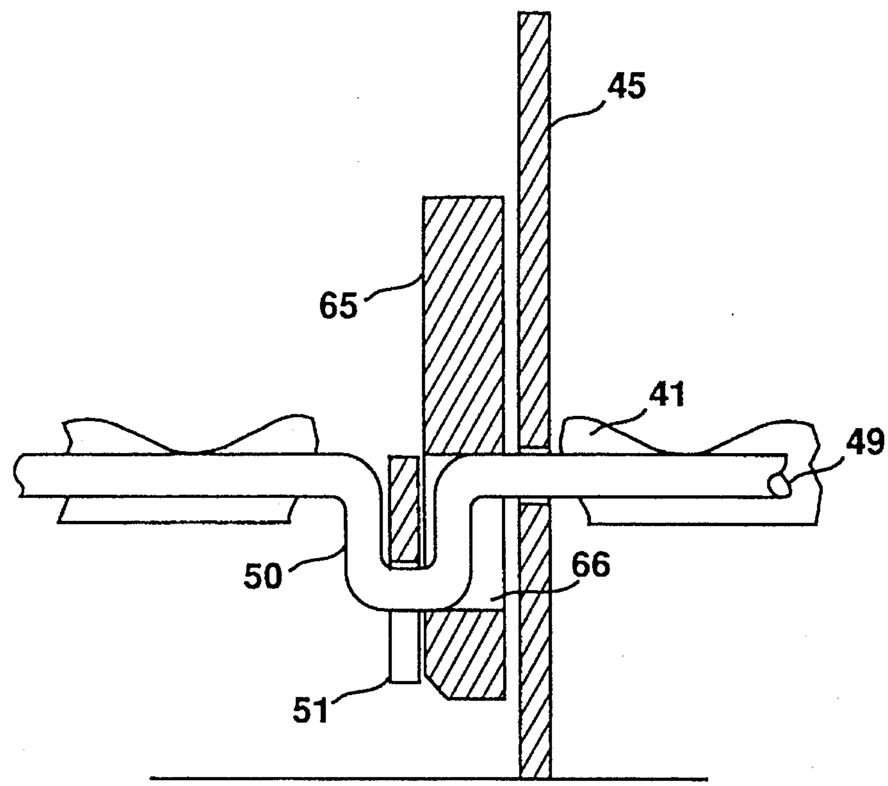
FIG. 5 shows a partial sectional view taken along the lines V—V in FIG. 4.

As illustrated in FIGS. 3 to 5, an indicator member 65 with a slot 66 is installed over part of the cranked extension 50 of one of mounting rods 49, between intermediate frame member 45 and adjustment slat 51. The cross-section of slot 66 and of cranked extension 50 are such that the latter closely fits within the former, whereby indicator member 65 is moved in a unitary manner with the corresponding mounting rod 49 and thus conjointly with louvre 41 attached thereto. The louvre 41 and indicator member 65 are thus directly linked and, when sieve opening d is adjusted, their movements are identical, i.e., louvre 41 and indicator member 65 are both pivoted about the same angle.

The indicator member 65 comprises an arm 69 which extends substantially towards the rear of sieve 31. The rear end of arm 69 is provided with an arcuate surface. The circular cross-section thereof makes this surface remain at a constant distance from rear frame member 43, when sieve opening d is adjusted and indicator member 65 is pivoted accordingly.

Figure 6:
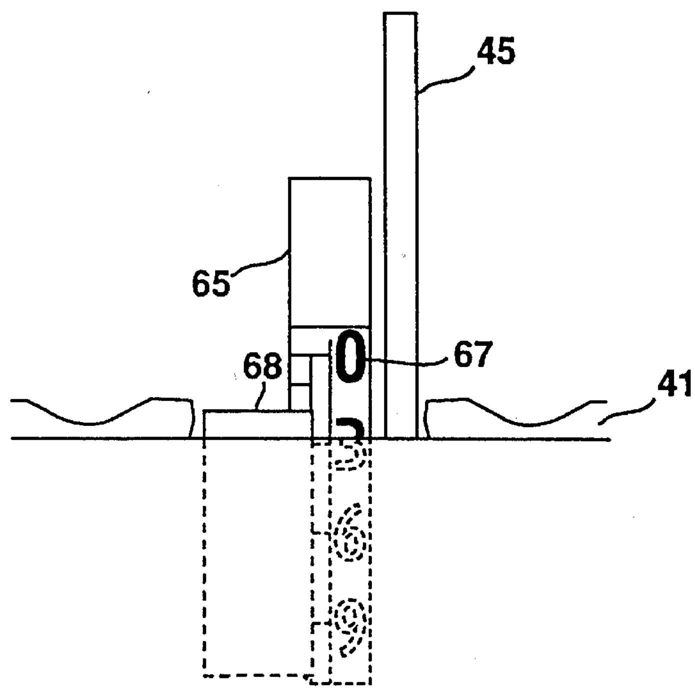
FIG. 6 shows a partial rear view taken along the lines VI—VI in FIG. 6.

As best seen in FIG. 6, a graduated scale 67 is provided on the said arcuate surface of indicator member 65. Proximate to this surface a reference plate 68 is welded to the rear frame member 43, the top edge of which plate 68 indicates sieve opening d on graduate scale 67. The relative position of the calibrations thereof on indicator member 65 is such that the zero position, which can be determined with reference to the top edge, corresponds to fully closed louvres 41, whereas a scale reading above zero corresponds to actual sieve opening d, expressed in millimeters. Alternatively this sieve opening d may be expressed in any other suitable length unit, such as fractions of an inch.

Figure 7:
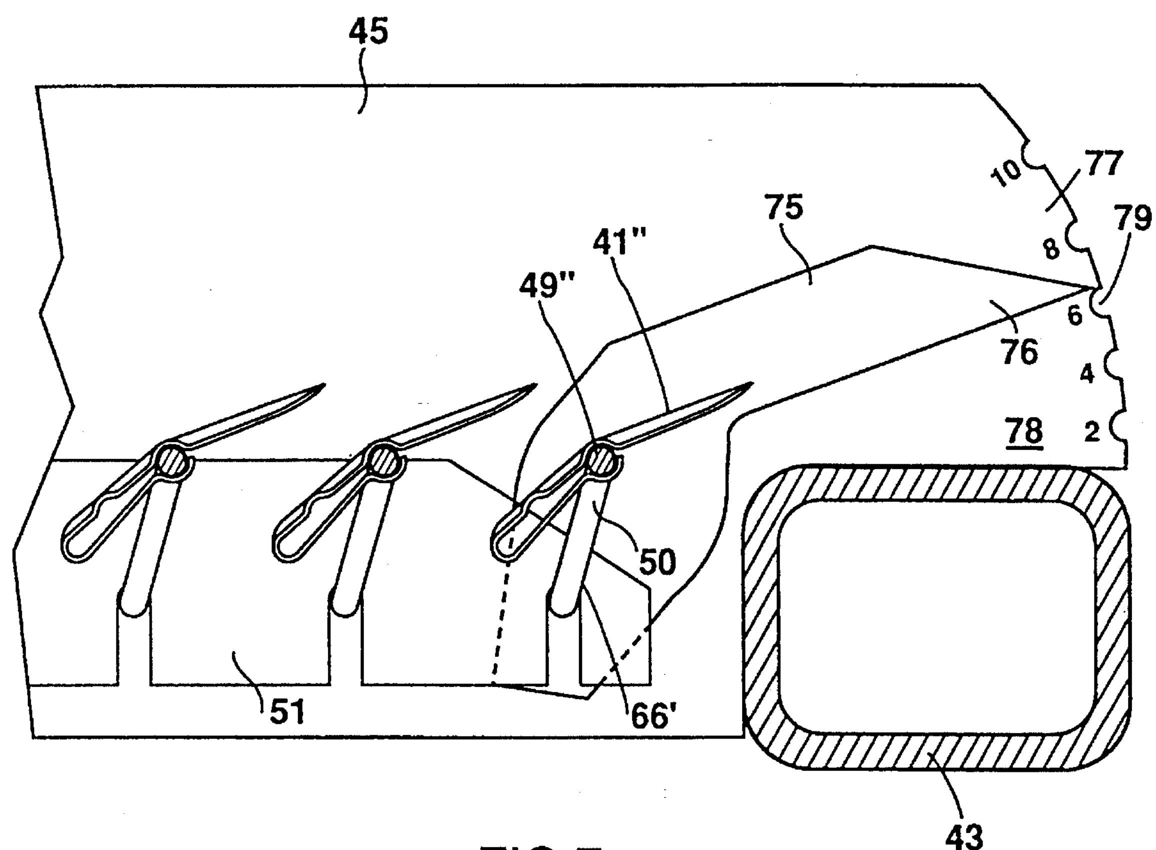
FIG. 7 illustrates an indicator means according to an alternative arrangement of certain elements of the invention.

In FIG. 7 an alternative of the sieve opening indicator means 48 is shown. Comparable to the first arrangement, an indicator member 75, which is installed between the intermediate frame member 45 and the adjustment slat 51, comprises a slot 66', which closely fits over cranked extension 50 of one of mounting rods 49. The movement of this indicator member 75 is thus equal to the movement of indicator member 65 illustrated in FIGS. 3 to 6. The rear part of indicator member 75, ending in a pointer 76, lies adjacent to the rear portion of intermediate frame member 45, which takes the form of an arcuately shaped sector 78. On this sector 78, a graduated scale 77 is provided along the path of pointer 76, which indicates the actual sieve opening d in millimeters or any other suitable length unit, on scale 77. The graduated scale 77 is formed by a series of notches 79 in sector 78.

In both alternatives, opening indicator means 48, comprising the indicator member 65, respectively 75, and reference plate 68, respectively 78, lay adjacent to sieve adjustment means 47, in such way that a person who is standing at the rear of the sieve 31 and operating adjustment means 47 to change sieve opening d, has a direct view on graduated scale 67, respectively 77. Thus the operator can immediately verify the resulting opening d during the adjustment thereof, without having to move to another location. In this manner, the relative position of indicator means 48 and adjustment means 47 enables a swift and precise sieve setting.

Figure 8:
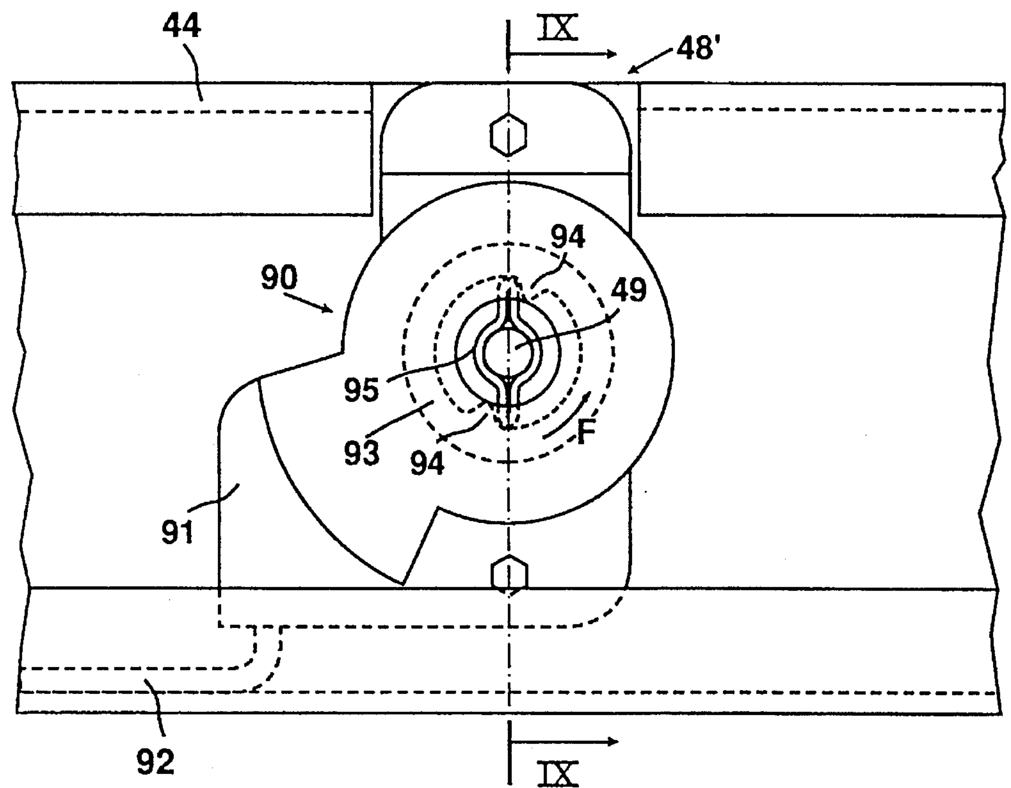
FIG. 8 is a view of another alternative, taken in a direction as indicated by the arrow VIII in FIG. 2.
Figure 9:
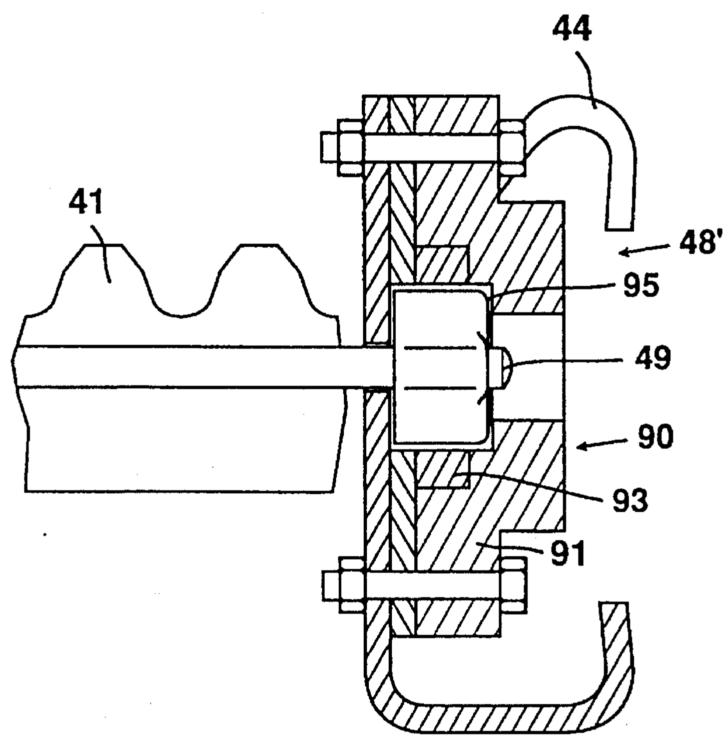
FIG. 9 shows a partial sectional view taken along the lines IX—IX in FIG. 8.

As illustrated by FIG. 8 a still further alternative opening indicator means 48' may comprise a potentiometric device 90, of which the body 91 is attached to side frame member 44. Rotatably mounted within said body 91 is a potentiometer rotor 93, which is urged by resilient means (not shown) to rotate in the sense as indicated by arrow F in FIG. 8. The potentiometric device 91 includes a set of wire connections 92, at which the electricl resistance over said device can be sensed, which resistance is a function of the relative rotational angle of rotor 93 to body 91. This rotor 93 is provided with a hollow center into which extends a pair of rotor projections 94. The resilient means hold these projections 94 in abutment with the flat edges of a winged extension 95, which is positioned within the hollow center and fixedly attached to the outer end of one of mounting rods 49. The relative rotational angle of rotor 93 and the corresponding resistance over potentiometric device 90 thus are determined by the rotational angle position of mounting rods 49 and the louvres attached thereto.

When mounting rods 49 are pivoted in the sense as indicated by arrow F, the resilient means will urge projections 94 of rotor 93 in further permanent contact with the edges of winged extension 95. The rotor 93 thus follows the pivotal movement of louvres 41. On the other hand, when mounting rods 49 are pivoted in the opposite sense, winged extension 95 attached thereto will counteract the force of the resilient means on the edges thereof and urge rotor 93 to pivot concurrently. In this case too rotor 93 reproduces the pivotal movement of louvres 41. Thus in both cases the electrical resistance which is sensed over potentiometer device 90, will permanently remain a function of the rotational louvre angle and corresponding sieve opening d.

The flat edges of extensions 95 are parallel to mounting rods 49. When these mounting rods 49 are subjected to small axial displacements such as those caused by machine vibrations, the flat edges will axially slide over rotor projections 94, so that the axial displacements are not transferred upon the potentiometric device 90 and consequential damages thereto are prevented.

With conventional electronic means, which will not be described in any detail, the electrical resistance which is sensed over potentiometric device 90, can be used to display corresponding sieve opening d to the operator at any suitable location on the combine. A particularly advantageous location for such display is adjacent to sieve adjustment means 47. Alternatively adjustment means 47 may be steered by the operator through remote control, in which case both sieve opening d display and the remote control can be placed in operator's cab 6.

The opening indicator means 48 and 48' of the foregoing structure eliminate the need for further verification of sieve opening d with gauges in the unaccessible area under upper sieve 30. Tolerances, play and deformation of the components of adjustment means 47 will not affect the accuracy of the indicator reading because the movement of indicator member 65 is unitarily linked to the movement of mounting rod 49 and louvres 41 attached to it.

Still other alternatives of the opening indicator means of FIGS. 3 to 7 are conceivable, for example an indicator member may be attached to a mounting rod or directly to a louvre by way of welding, gluing or any other suitable method. In all cases the indicator member will move in unison with the louvre to which it corresponds.

Also the manual sieve adjustment means 47 as described above may be replaced by adjustment means which use electrical, hydraulic or pneumatic actuators to change the position of adjustment slat 51. In all cases remote control of such adjustment means can be envisaged.

While the preferred structure in which the principles of the present invention have been incorporated is shown and described above, it is to be understood that the invention is not to be limited to the particular details, as shown and described above, but that, in fact, slight variations of the type referred to above or widely different means may be employed in the practice of the broader aspects of the invention.

Having thus described the invention, what is claimed is:

1. Adjustable sieve means for an agricultural harvesting machine comprising, a plurality of louvers mounted on said frame behind one another and being pivotally movable through a range of positions between a fully closed and a fully opened position, consecutive louvers defining an opening when in an opened position, adjustment means for changing said opening, and opening indicator means including a movable part coupled to and moveable in concert with said adjustment means through a second range of positions that correspond to said range of positions of said louvers, the improvement comprising means for coupling said movable part to at least one of said louvers for conjoint movement therewith when said opening is adjusted by said adjustment means, said at least one louvre and said movable part being pivotable about a common axis, and readable means indicating the position of said movable part within said second range of positions.

2. Adjustable sieve means according to claim 1 wherein said adjustment means further comprise a rod shaped, movable support to which said at least one louvre is affixed, and means for moving said rod to adjust said opening and the position of said movable part to indicate the relative position of said louvers in said range.

3. Adjustable sieve means according to claim 2 wherein said readable means further includes a stationary part which is fixedly attached to said frame, which stationary part serves as a reference point for reading out the actual sieve opening.

4. Adjustable sieve means according to claim 3 wherein said indicator means further comprise a potentiometric device having a rotary part and a fixed part and said movable part comprises said rotary part therof.

5. Adjustable sieve means according to claim 4 wherein said potentiometric device further comprises resilient means which holds said rotary part in abutment with said movable support.

6. Adjustable sieve means according to claim 1 wherein said indicator means further comprise a potentiometric device having a rotary part and a fixed part and said movable part comprises said rotary part thereof.

7. Adjustable sieve means according to claim 6 wherein said potentiometric device further comprises resilient means which holds said rotary part in abutment with said movable support.

* * * * *